United States Patent
Carbonell et al.

[19]

[11] Patent Number: 6,091,177
[45] Date of Patent: Jul. 18, 2000

[54] SPRING MOUNTING FOR AN ELECTRIC GENERATOR

[75] Inventors: Luis Enrique Carbonell, Deltona; John Barry Sargeant, Oviedo; Lon W. Montgomery, Winter Springs, all of Fla.

[73] Assignee: Siemens Westinghouse Power Corporation, Orlando, Fla.

[21] Appl. No.: 09/274,260

[22] Filed: Mar. 22, 1999

[51] Int. Cl.$^7$ ...................................................... H02K 5/00
[52] U.S. Cl. ........................... 310/91; 310/258; 310/254; 310/89; 310/75 A
[58] Field of Search ................... 310/258, 254, 310/91, 75 A, 89; 171/252

[56] References Cited

U.S. PATENT DOCUMENTS

| | | |
|---|---|---|
| 2,320,843 | 6/1943 | Baudry . |
| 2,561,994 | 7/1951 | Rashevsky et al. . |
| 2,811,659 | 10/1957 | Barlow et al. . |
| 2,846,603 | 8/1958 | Webster et al. . |
| 3,791,682 | 2/1974 | Mitchell . |
| 4,174,482 | 11/1979 | Bollman . |
| 4,341,968 | 7/1982 | Borden et al. . |
| 4,387,317 | 6/1983 | Alkire et al. . |
| 4,425,523 | 1/1984 | Detinko et al. . |
| 4,572,980 | 2/1986 | Anderson et al. . |
| 4,584,497 | 4/1986 | Butman, Jr. et al. . |
| 4,656,382 | 4/1987 | Moore et al. . |
| 4,663,553 | 5/1987 | Zimmermann ........................... 310/258 |
| 4,694,190 | 9/1987 | Lane et al. . |
| 4,739,206 | 4/1988 | Sieber ........................................ 310/91 |
| 4,891,540 | 1/1990 | Cooper et al. . |
| 4,942,326 | 7/1990 | Butler, III et al. . |
| 4,975,613 | 12/1990 | Brem et al. .............................. 310/258 |
| 5,117,140 | 5/1992 | Sargeant et al. .......................... 310/91 |
| 5,373,211 | 12/1994 | Ramirez-Coronel et al. . |
| 5,397,950 | 3/1995 | Norbury et al. .......................... 310/91 |
| 5,442,249 | 8/1995 | Zimmermann ............................. 310/91 |

*Primary Examiner*—Nestor Ramirez
*Assistant Examiner*—Thanh Lam
*Attorney, Agent, or Firm*—Eckert Seamans Cherin & Mellott, LLC

[57] ABSTRACT

A support system for an electric generator having a spring bar connected between the stator frame and a vertical spring plate mounted on a foundation. The spring bar provides flexibility in the tangential direction to minimize the magnitude of torque loads transmitted to the foundation during short circuit operating conditions. The spring plate provides flexibility in the radial direction to minimize the magnitude of vibration loads transmitted to the foundation during normal operating conditions. The combination of a spring bar with a spring plate allows the support system designer to optimize the natural frequency of the support system in both the tangential and radial directions.

16 Claims, 3 Drawing Sheets

SPRING MOUNTING FOR AN ELECTRIC GENERATOR

FIELD OF THE INVENTION

The present invention relates to electric generators, and more specifically, to a spring mounting system supporting a stator core and stator core frame of such generators.

BACKGROUND OF THE INVENTION

As the rotor of an electric generator rotates, its magnetic field revolves in unison with the rotor. This rotating magnetic field exerts a cyclical force on the generator's stator core. This force, in turn, causes vibrations to occur in the core which are of concern in high speed, high power machines. The stator core of a machine having a two-pole rotor experiences an elliptical deformation that follows the rotation of the rotor during operation, with resulting vibrations that are at a frequency twice that of the rotational speed of the rotor. The cyclical vibrations will be transmitted through the frame to the generator foundation. The magnitude will depend upon the degree of isolation incorporated in the design.

It is known in the art to utilize spring plates to resiliently support a stator core and stator core frame. For example, U.S. Pat. No. 2,320,843, issued to Baudry on Jun. 1, 1943, incorporated by reference herein, discloses a stator support structure made from flat plates mounted tangentially to the perimeter of a stator core frame. The support structure of Baudry includes a pair of vertical spring plates mounted to the perimeter of the stator core frame along opposed sides of the frame. These vertical spring plates are placed into compression by the dead weight of the generator stator and frame. Due to the geometry of the plates, they are rigid in the vertical (compression) direction, but are relatively flexible in the horizontal (bending moment) direction. Additional horizontal spring plates are attached to the perimeter of the stator core frame along its bottom. Due to the geometry of these plates, they provide rigid support in the horizontal (compression) direction, but are relatively flexible in the vertical (bending moment) direction. Together, the vertical and horizontal plates provide rigid vertical and horizontal support for the generator, while at the same time providing a degree of flexibility to accommodate radial vibrations of the stator core. During its operation, an electric generator may experience a short circuit or other abnormal operating condition. Although the prior art support design performs well in isolating the radial vibrations generated during normal operation of the generator, it is less effective in reducing the tangential torque transmitted to the foundation during short circuit conditions. During these irregular operating conditions, an electric generator may experience torque loads as high as twenty times, or more, the normal operating torque. This large torque amplification mandates a very robust support structure, which in turn tends to reduce the desired flexibility in the radial direction.

The object of the present invention, therefore, is to provide an electric generator having a support system that is capable of both providing the necessary support in both the horizontal and vertical directions while providing sufficient flexibility in the radial direction to dampen rotating force loads, and further to provide sufficient strength and flexibility in the tangential direction to accommodate short circuit and off-normal operating torque loads. It is a further object of this invention to provide an electric generator having a support system that functions to isolate the foundation from the radial vibration forces generated during normal operation and from the tangential forces generated during short circuit and other abnormal operating conditions.

SUMMARY

These and other objects of the present invention are achieved in a support system for an electric generator having a spring bar extending longitudinally along a perimeter of the stator core frame of the generator and attached to the stator core frame at a first plurality of locations, and a spring plate extending longitudinally along the perimeter of the stator core frame, the spring plate having a first end attached to the spring bar at a second plurality of locations and having a second end attached to a foundation.

BRIEF DESCRIPTION OF THE DRAWINGS

For a better understanding of the present invention, the following detailed description should be considered in conjunction with the accompanying drawings in which.

The same reference numbers are used to refer to the similar parts throughout the various figures.

DETAILED DESCRIPTION OF THE INVENTION

Figure 1:
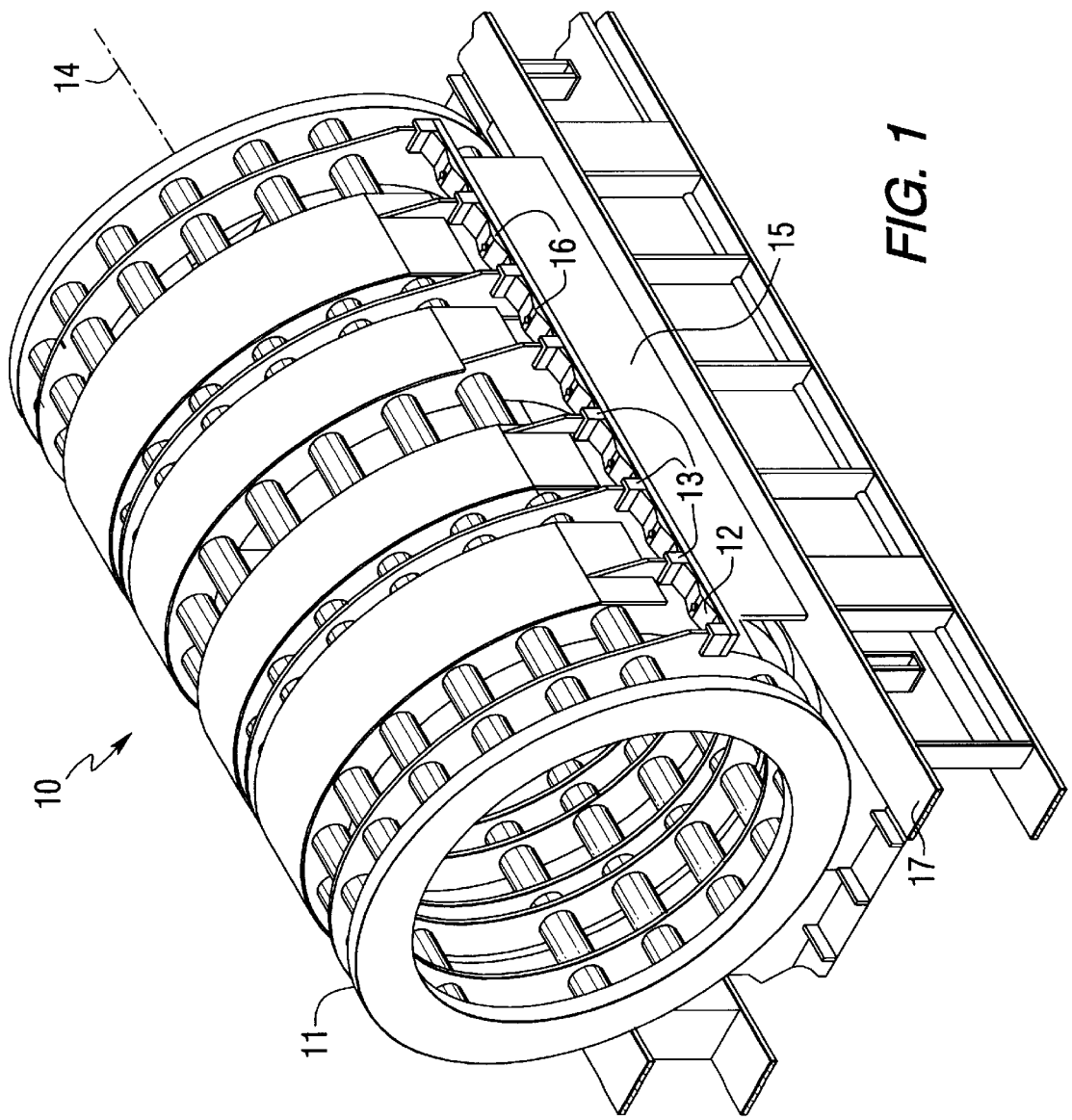
FIG. 1 is a partial cutaway perspective view of n electric generator stator core frame illustrating support structure in accordance with the present invention.

FIG. 1 is a perspective view of a stator core frame 11 of an electric generator 10 illustrating a support structure in accordance with the present invention. In the embodiment of FIG. 1, the outer periphery of the stator core frame 11 is connected to a tapered spring bar 12 at a plurality of attachment points 13 along its length. The attachment points 13 form a line parallel to the central axis 14 of the generator, and they are located along the perimeter of the frame at points where the tangent line is vertical. The tapered spring bar 12 runs the longitudinal length of the stator core frame 11. The tapered spring bar 12 is, in turn, connected to a spring plate 15 disposed in an imaginary plane at a plurality of connection points 16 that are interposed between attachment points 13. The spring plate 15 extends vertically downward from attachment points 13. The opposed end of the spring plate 15 is mechanically connected to a foundation 17. Though only one spring plate 15 and spring bar 12 combination is shown in FIG. 2, a second tapered spring bar 12 and spring plate 15 combination is connected to the opposite side of the stator core frame 11 at points along the frame 11 where the tangent line is vertical.

Figure 2:
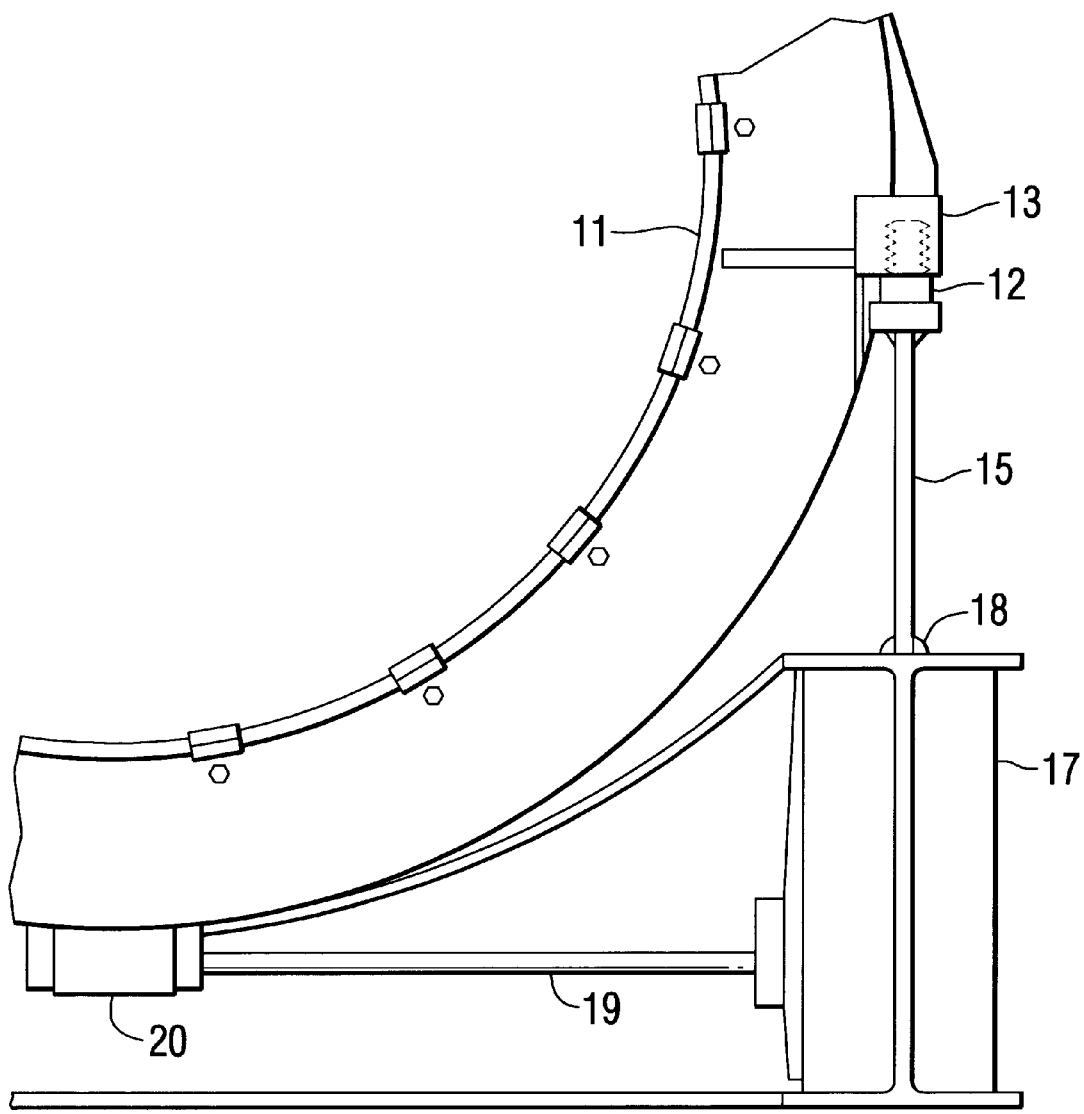
FIG. 2 is an end view of the device of FIG. 1.

FIG. 2 is an end view of the device in FIG. 1. The spring plate 15 connection to the foundation 17 is shown in this view to be a weld 18. The top end of the spring plate 15 is shown attached to the tapered spring bar 12. The tapered spring bar 12 is, in turn, attached to the stator core frame 11 at a plurality of attachment points 13.

Since the vertical spring plates 15 have considerable resilience in the horizontal direction, the generator would not be properly restrained from horizontal movement if it were supported by spring plates 15 alone. To provide the necessary horizontal support, the support system of FIG. 2 also includes a stabilization bar 19. One end of the stabilization bar 19 is attached to the stator core frame 11, and the opposed end is attached to the foundation 17. The stabilization bar 19 is connected in this embodiment so that it is in a horizontal position. The stabilization bar 19 is fixed to the stator core frame 11 at an attachment point 20 which protrudes beyond the outer periphery of the stator core frame 11. Depending upon the size of the electric generator 10, a plurality of stabilization bars 19 may be used. The location of the attachment points 20 are chosen to be at points of near zero tangential vibration, as predicted by calculation techniques known in the art, such as those described in the Baudry patent.

The generator support system of the present invention allows the designer to tune the resonant torsional frequency of the system to minimize the loads transmitted to the foundation 17. In particular, the embodiment illustrated in FIGS. 1 and 2 allows the designer to determine the system natural frequency in both the radial and the torsional directions.

The torque load amplification during short circuit conditions is a function of the air gap torque, the system natural frequency, and the rotor rotating frequency. The air gap torque and the rotor frequency are functions of the generator design. However, by controlling the system natural frequency, the off-normal torque loading imposed on the generator support system can be minimized. It is known in the art that vibration isolation is possible only when the ratio of forcing frequency to natural frequency is greater than $\sqrt{2}$ and preferably should be 2.5 to 3.5 times if significant reduction in response is desired. Therefore, it is desirable to "low tune" the torsional natural frequency of the support system. The addition of the spring bar 12 as a means for connecting the stator core frame 11 and the spring plates 15 enables the desired low values of torsional natural frequency to be attained. This feature is enhanced by incorporating a tapered profile to the spring bar 12 which may be visualized as a string of connected cantilevers. It will be appreciated by those skilled in the art that a tapered section cantilever will provide greater flexibility for a given material strength than would a parallel section.

The spring plates 15 provides vertical support for the stator's dead weight and isolates the radial vibrations of the stator core in the electric generator 10. The spring plates 15 also provide tangential stiffness to support the stator core (not shown) and stator core frame 11. The tapered spring bar 12 serves to attenuate tangential forces experienced by the electric generator 10 during off-normal operation. The stabilization bar 19 provides horizontal support for the core and frame.

Figure 3:
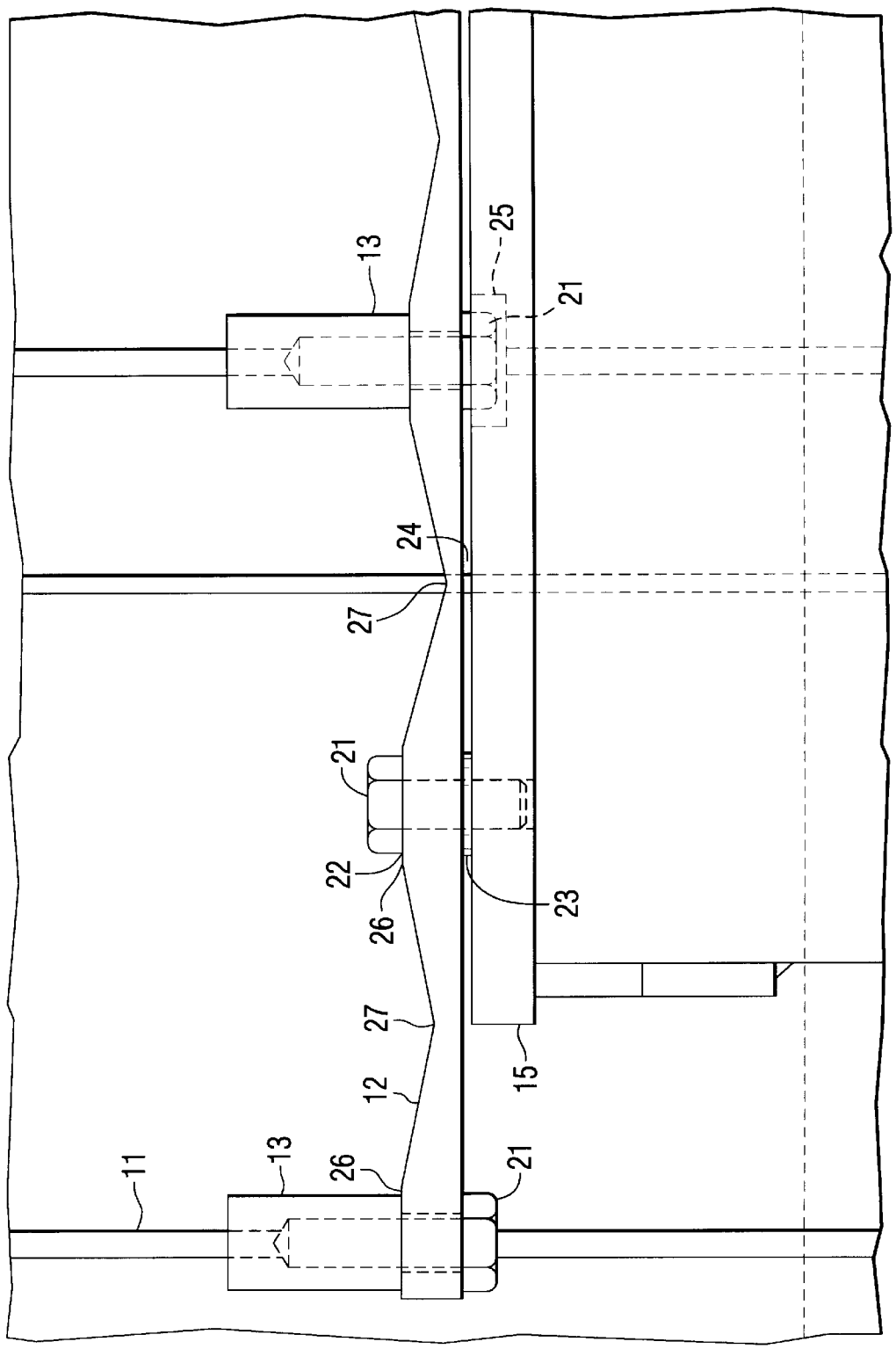
FIG. 3 is a side elevational view of the stator support structure of FIG. 1.

FIG. 3 is a side elevation view of the stator support structure of FIG. 1. In the embodiment of FIG. 3 a bottom side of the tapered spring bar 12 is fixed to the top of spring plate 15 with mechanical connectors 21, for example a threaded bolt, at a plurality of predetermined attachment points 22. A washer-like spacer 23 fits around the mechanical connector 21 and is compressed between the spring plate 15 and the tapered spring bar 12 when the mechanical connector 21 is tightened. The spacer 23 creates a gap 24 between the spring plate 15 and spring bar 12 at all other locations along the longitudinal length of the spring plate 15 and spring bar 12 where a spacer is not in place. The tapered spring bar 12 is fixed to the stator core frame 11, also with mechanical connectors 21, at a plurality of predetermined attachment points 13 along the perimeter of the stator core frame 11. A counter-bore 25 is provided in the top of the spring plate 15 to provide room for the mechanical connector 21 to deflect downward during relative movement between the stator frame 11 and the spring plate 15. The spring bar 12 provides a mechanical connection between the stator frame 11 and the spring plate 15, while the gap 24 allows for relative vertical movement between those two structures. Spring bar 12 and its counterpart located on the opposite side of the generator provide a spring connection that adds flexibility to the support system in the tangential direction. Spring bar 12 is very stiff in the horizontal direction and is essentially a rigid connection in a the direction perpendicular to the plane of the spring plate, and therefore its presence does not significantly affect the reaction of the support system to radial forces. However, the stiffness of the spring bar 12 in the vertical direction can be selected by the support system designer to reduce the natural frequency in the tangential direction, thereby providing for a reduction in the short circuit torque build-up forces that are transmitted to the spring plate 15 and foundation 17.

The spring bar 12 may be constructed of materials known in the art for forming springs, such as spring steel or other metal. The spring bar 12 may have a variety of shapes but is illustrated in the figures as being generally rectangular with a varying thickness along its length. The thickness of spring bar 12 is illustrated as being thickest at the points of attachment 13,22 to the stator core frame 11 and the spring plate 15. The thickness at these locations is generally dictated by the size and shape of the mechanical connectors 21 used to connect the spring bar 12 to the frame 11 and spring plate 15. The most simple design for the spring bar 12 would be to have a constant thickness along its entire length. However, if the thickness required at the connection points 13,22 is utilized along the entire length of the spring bar 12, the resulting stiffness of the spring will generally be too high. Therefore, a preferred embodiment of the spring bar 12 is as shown in FIG. 3 where the spring has a tapered thickness along its length. A spring bar 12 with a tapering configuration is used so that the spring bar's cross sectional thickness is greatest at the connection points. Advantageously, these locations are also the locations where the spring bar 12 experiences its maximum bending moment due to torsional loads, such as short-circuit conditions. Between two points 26 of maximum bending force the spring bar 12 progressively narrows, or continuously tapers, until a point 27 midway between the adjacent points 26 of maximum bending moment. At the midpoint 27 between the points of attachment 13,22 the thickness of the tapered spring bar 12, and thereby its cross-sectional area, is at its smallest value. This reduction in thickness provides increased flexibility to the spring bar 12 in the tangential direction. An alternative embodiment of spring bar 12 (not shown) would have a first thickness at the points of attachment 13,22 and a second reduced thickness along the entire length of the spring between those point. This alternative embodiment provides improved flexibility due to the continuous reduced cross section, however, it has the disadvantage of having its reduced cross sectional area located at or near the point of maximum bending force 26, thus creating a point of very high bending stress. Advantageously the tapered design of FIG. 3 provides for the point of maximum bending force 26 to be located remote from the point of smallest cross-sectional area 27, thereby reducing the peak stress in the spring bar 12. Preferably the minimum cross-sectional area section transmits shear force only, as there is no bending moment at the midpoint between attachment points.

While the invention has been described in what is presently considered to be a preferred embodiment, many variations and modifications will become apparent to those skilled in the art. Accordingly, the invention should not be limited to the specific illustrative embodiment, but should be interpreted within the full spirit and scope of the appended claims.

What is claimed is:

1. A support structure for mounting an electric generator on a foundation, the electric generator having a stator core frame, the support structure comprising:

a spring plate disposed in a plane and having a first side connected to said foundation and extending longitudinally along a perimeter of said stator core frame;

a means for connecting said stator frame to a second side of said spring plate, said means for connecting further comprising an essentially rigid connection in a direction perpendicular to said plane and a spring connection in a direction parallel to said plane.

2. The support structure of claim 1, wherein said means for connecting further comprises a spring bar connected to said spring plate at a first plurality of locations and connected to said stator frame at a second plurality of locations interposed between said first plurality of locations.

3. The support structure of claim 2, further comprising said spring bar having a first cross-sectional area at said first and said second plurality of locations and having a tapered cross-sectional area therebetween.

4. The support structure of claim 3, wherein said tapered cross-sectional area has a minimum value at points midway between said first and said second plurality of locations.

5. The support structure of claim 3, wherein said tapered cross-sectional area has a minimum value at a point remote from a point of maximum bending force due to torsional loading on said generator.

6. A support structure for mounting an electric generator on a foundation, the electric generator having a stator core frame, the support structure comprising:

a spring bar extending longitudinally along a perimeter of said stator core frame and attached to said stator core frame at a first plurality of locations;

a spring plate extending longitudinally along said perimeter of said stator core frame, the spring plate having a first end attached to said spring bar at a second plurality of locations and having a second end attached to said foundation.

7. The support structure of claim 6, wherein said spring bar comprises a generally rectangular cross-section having a tapered cross-sectional area along its length.

8. The support structure of claim 7, wherein a point of smallest cross-sectional area along the length of said spring bar is located remote from a point of highest bending force due to torsional loading of said generator.

9. The support structure of claim 7, further comprising said spring bar having a minimum cross-sectional area midway between one of said first plurality of locations and one of said second plurality of locations.

10. The support structure of claim 7, further comprising said spring bar having a minimum cross-sectional area at a point of zero bending moment due to torsional loading of said generator.

11. The support structure of claim 6, further comprising a stabilization bar attached between said foundation and said perimeter of said stator core frame.

12. A support structure for mounting an electric generator on a foundation, the electric generator having a stator core frame, the support structure comprising:

a first spring bar attached to a first side of said stator core frame;

a second spring bar attached to a second side of said stator core frame opposed said first side;

a first vertical spring plate attached between said first spring bar and said foundation;

a second vertical spring plate attached between said second spring bar and said foundation.

13. The support structure of claim 12, wherein each of said spring bars comprises a tapered cross-sectional area between a point of attachment to said stator core frame and a point of attachment to its respective vertical spring plate.

14. The support structure of claim 13, wherein each of said spring bars comprises a minimum cross-sectional area at a mid-point between the points of attachment to said stator core frame and said respective vertical spring plate.

15. The support structure of claim 13, wherein each of said spring bars comprises a minimum cross-sectional area at a point remote from a point of maximum bending force exerted on said spring bars during the operation of said generator.

16. The support structure of claim 12, further comprising a stabilization bar attached between said foundation and said stator core frame.

* * * * *